May 9, 1967 — C. F. SCHWALL, JR — 3,318,357

PNEUMATIC TIRE

Filed April 23, 1965

INVENTOR
CHESTER F. SCHWALL, JR.
BY Frank J. Earnheart
James A. Lucas
ATTORNEYS 3,318,357
PNEUMATIC TIRE
Chester F. Schwall, Jr., Akron, Ohio, assignor to The General Tire & Rubber Company, a corporation of Ohio
Filed Apr. 23, 1965, Ser. No. 450,471
2 Claims. (Cl. 152—363)

This invention relates to a toroidal pneumatic tire. More particularly, this invention relates to a high speed tire characterized by a toroidal carcass containing individual plies of continuously wound cord filaments or tapes, and bead means within said carcass for holding the tire onto the rim of a wheel.

The known procedure for building a pneumatic tire involves sequentially wrapping a plurality of plies of closely spaced parallel rubberized cords around a drum surface to form an annular cylinder and thereafter anchoring inextensible bead rings or bundles in the sides of the cylinder to form the carcass. Generally, the plies are wrapped so that the cords thereof form an angle ranging from about 28° in the case of bias ply tires to 90° for radial ply tires, this angle measured from the circumferential plane of the tire. After the carcass is formed, suitable chafer strips, sidewall stock, and tread stock are applied to the carcass after which the tire is shaped and cured in a suitable mold.

Tires constructed in this manner have certain inherent deficiencies. For example, this type of construction results in a tire that is nonuniform in cross section, particularly in the area of the beads where the edges of the carcass plies are folded around the bead rings. With such a construction it is impossible to make optimum use of the carcass cords and other materials used in the tire. Another drawback is the production of a number of natural flexural points and areas of high heat build-up in the tire, these factors contributing to rapid degradation and premature failure of the tire.

All of these drawbacks are even more pronounced when a tire is used on very fast and/or heavy aircraft and is subjected to repeated impacts during high speed landings.

Accordingly, it is an object of this invention to overcome the inherent drawbacks of conventionally constructed tires.

It is a second object of this invention to produce a filament-wound, totally enclosed tire adapted to be securely held upon the rim of a wheel.

It is another object of this invention to produce a tire having a thin uniform cross-sectional configuration and possessing better heat stability and improved fatigue resistance than tires heretofore produced.

A further object is to produce a pneumatic tire adapted to fit upon an existing tire rim, which tire comprises a toroidal carcass containing plies of filamentary material wound continuously therearound, inextensible bead means for maintaining the tire on said rim, and a tread and sidewall portion composed of an elastomeric material.

These objects, as well as others not enumerated, are accomplished in the manner described in the following specification and attached drawings in which.

Figure 1:
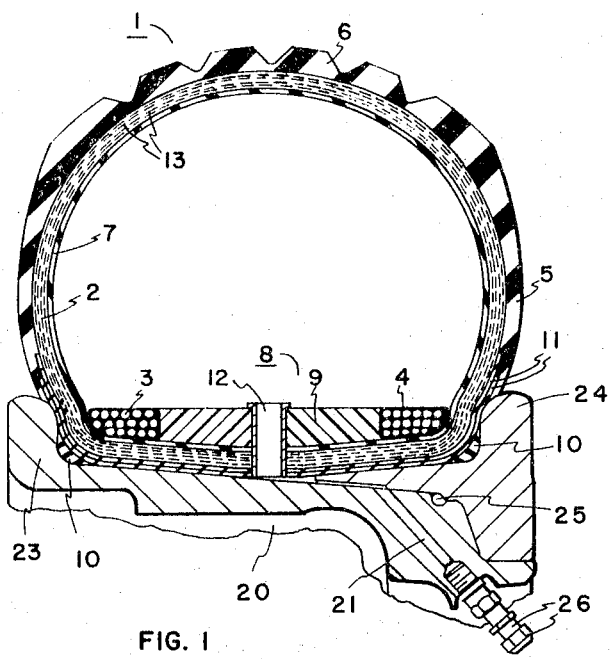
FIGURE 1 shows a cross section of a tire representing a preferred embodiment of the invention, said tire seated upon a rim provided with a demountable flange.

Referring now to FIGURE 1, there is shown a tire 1 comprising a carcass 2, sidewalls 5, and a thread portion 6, said tire mounted upon a rim 20 of a wheel, said rim having two flanges 23, 24. Disposed interiorly of the carcass is an inner liner 7 of an elastomeric material which is highly impervious to air. This liner serves to prevent the escape of air from within the inflated tire through the plies of the carcass. The carcass 2 is composed of a plurality of layers 13 of closely spaced parallel rubberized filaments, the filaments in each layer extending completely around the carcass in a spiral fashion in a manner to be more fully described hereafter. These filaments may be of any suitable tire reinforcement material such as nylon, rayon, Fiberglas, or wire.

Located within the inner liner 7 is a novel device 8 which serves to keep the tire on the rim of the wheel. This device comprises a pair of inextensible bead rings 3, 4 separated by a spacer 9. This spacer is substantially incompressible in the axial direction and is preferably inextensible in the radial direction. Typically, the spacer assumes the shape of a flat annular ring and can be made from any suitable rigid material such as metal or plastic.

The inextensible bead rings are desirably, but not necessarily, made according to well-known techniques utilizing strands of rubber-coated steel wire. The portion of the rings in contact with the inner liner 7 is shaped to conform thereto, thereby eliminating sharp contacting edges which would have a tendency to abrade or cut through the liner.

The inextensible bead rings 3, 4 function in a conventional manner to maintain the tire on the rim of the wheel. The spacer assures that the rings maintain their respective positions at either side of the tire, thus serving to impart lateral stability to the tire, even when subjected to severe stresses applied obliquely to the tire. Without the spacer there would be a tendency for the bead rings to move toward one another, resulting in an appreciable decrease in stability.

Outwardly of the carcass, coextensive with the portion of the tire in contact with the wheel rim, suitable chafer strips 11 of the type well known in the art are used to prevent abrasive disintegration of the plies of the carcass. These chafer strips generally consist of square woven fabric skim coated with rubber, or a thin layer of material such as a sheet of rubber-coated, randomly dispersed, polyester fibers.

Strips of elastomeric material form the heel portions 10 of the tire. These strips are molded, during the curing of the tire, to conform to the small radii of the flanges 23, 24 thus insuring that the tire fits the contour of the rim, and that the carcass cords and chafer strips follow a smooth, arcuate path.

The tread 6 and sidewall 5 comprise the exterior portion of the tire. These are preferably made from any one of a wide variety of natural or synthetic rubber compounds formulated so as to obtain an optimum balance of properties.

A sleeve 12 is positioned within an annulus provided in spacer 9 and extends through the inner liner, carcass, and chafer strips where it communicates with an air passage 21 within the rim 20, and thence to an inflation valve 26.

Although its use is not limited to any particular type of rim, the tire in FIGURE 1 is shown mounted on the rim of an aircraft-type wheel. This rim is composed of a wheel hub terminating in a first flange 23, and a demountable flange 24 secured to said wheel hub by appropriate means such as bolts (not shown). An O ring 25 provides an airtight seal between the two flanges thereby preventing the escape of air through the rim. The tire is mounted on the wheel by removing the demountable flange and placing the tire upon the wheel hub so that the tire contacts and abuts the wheel hub flange 23. Thereafter the demountable flange is placed on the wheel hub and is secured thereto by a plurality of bolts which are tightened to urge said two flanges toward one another. Without the rim locking device 8 within the carcass of the tire, it can be seen that these two flanges, when urged toward one another, would push the sides of the tire and the bead rings 3, 4 toward one another, causing deformation of the carcass of the tire in the region of the flanges. However, the novel arrangement of the spacer between the bead rings provides a means for resisting this compressing effect, and because of the radially inextensible nature of the bead rings, serves to hold the tire in form contact with the rim.

In building the novel tire shown in FIGURE 1, the bead rings are formed from rubber-insulated wire according to well-established techniques and are then placed on either side of the rigid spacer to form the rim-locking device. Thereafter carcass plies, each ply consisting of a continuous cord or a plurality of continuous cords in the form of a tape, are wound around the beads and spacers to form a torus. This is preferably done by making a mandrel with the rim-locking device incorporated or embedded therein, the surface dimensions and shape of said mandrel and locking device conforming to the interior cross section of the carcass to be built.

To facilitate removal of the mandrel after completion of the carcass, the mandrel is preferably made out of a material which is readily dissolved in water or some other solvent, or which can be treated in such a manner as to permit it to be readily removed through the tire air inlet. For example, the mandrel can be made from a material such as plaster of Paris which can be readily dissolved in a mild acid such as acetic acid and can thereby be easily washed out from within the carcass. It is obvious that the mandrel material and the dissolving medium should be chosen from materials which do not corrode, deteriorate, or otherwise have an adverse effect on the various components of the tire.

After the mandrel is formed, with the spacer and bead rings incorporated therein, an air impervious inner liner is wrapped therearound, and the ends of the liner are stitched together. Exemplary of the materials that are suitable for use as an inner liner are butyl rubber, chlorobutyl rubber, and a compound containing a mixture of neoprene, natural rubber, and SBR (a copolymer of styrene and butadiene).

After placement of the inner liner about the mandrel, the carcass portion of the tire is constructed by wrapping independent cord filaments, or alternatively a tape constructed of a plurality of closely spaced filaments, continuously around the mandrel and inner liner until a ply of uniform thickness completely covers said inner liner. A wide variety of cord materials can be used for the carcass, but for purposes of illustration an 840/2 denier nylon 6.6, skim coated with a suitable elastomeric material such as a mixture of natural rubber and polybutadiene, has been found to be effective. As previously mentioned, however, other filamentary materials such as rayon, Fiberglas, and wire may be used.

Figure 2:
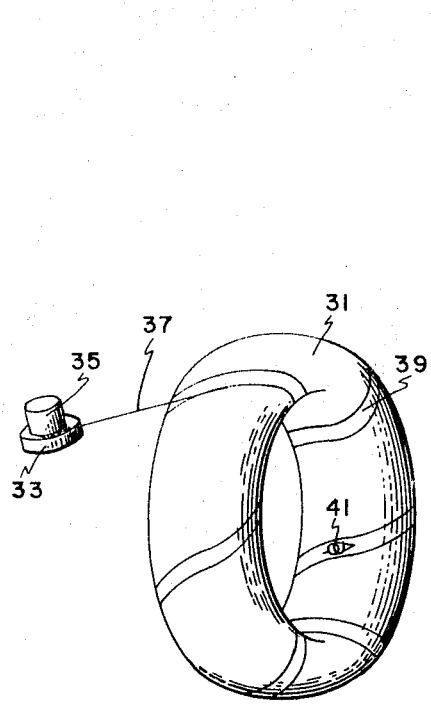
FIGURE 2 is a schematic diagram depicting the filament winding of the tire carcass.

FIGURE 2 shows the general manner in which the cord filaments are wound around the mandrel and inner liner. In this figure there is shown an inner liner 31 wrapped around a mandrel (not shown), and having an air-inlet sleeve 41 protruding therethrough. A spindle 33, containing a spool 35 of the aforementioned filamentary material, is revolved around the toric-shaped mandrel and inner liner to spirally wrap the filament 37 alongside of the filament strip 39 already disposed on the tire. This wrapping is continued until a uniform layer of filamentary material is disposed around the inner liner to form the first carcass ply. After formation of one ply, additional plies are wrapped around in a similar manner, the cords in the adjacent plies preferably forming equal but opposite angles to one another relative to the circumferential plane of the tire.

The number of plies, and the various angles of the filament or filaments in each ply, are determined by, among other things, the direction and magnitude of the loads to be imposed on the inflated tire in use. For example, a heavy-duty aircraft tire will require as many as 12 or 14 plies in the carcass. If the carcass is to be of bias ply construction, the cord filaments are wrapped in such a manner that the cord will cross the crown of the tire at an angle of, for example, approximately 39° measured from the circumferential plane of the tire, which angle gradually increases to about 50° as the filament extends into the sidewall portion of the tire, and will be about 60° in the radially inward surface of the torus, i.e. in the rim-contacting portion thereof. It should be understood, of course, that these angles change slightly as the tire is expanded into a mold. It should furthermore be understood that an infinite variety of cord winding programs can be used in constructing a carcass, with such factors as cord angle, wrapping tension, cord size, and spacing, as well as the number of layers, all being subject to regulation.

After a sufficient number of carcass plies are wrapped around the mandrel, suitable rubber stock is laid upon the carcass to form the tread, sidewall, and heel portions of the tire according to well-known techniques. The mandrel is then removed from within the tire, for example, by dissolving or dispersing the same in a liquid and removing the solution or dispersion through the air passage inlet. The tire is then placed into a suitable mold, having a matrix with the desired tread configuration therein, and is cured preferably by introducing hot water or steam into the interior of the tire, while concomitantly applying heat to the exterior of the tire. The resultant tire is then assembled onto the rim as hereinbefore described, and, after inflation, is ready for use.

An air inlet can be provided in the carcass in any one of a number of ways. For instance, a hole can be provided through the carcass and the inner liner and a valve or sleeve inserted therein. Alternatively, a valve or sleeve can be anchored in the mandrel or positioned in a hole in the bead spacer prior to the filament-winding operation after which the carcass plies are built, wrapping the filaments around the protruding valve or sleeve.

Figure 3:
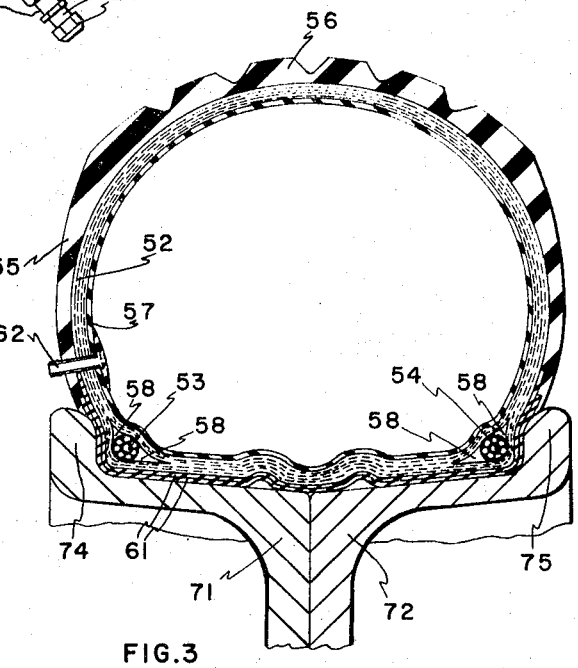
FIGURE 3 shows another tire cross section representing an alternative bead ring arrangement for seating the tire on a rim.

In another embodiment of the invention, the tire is built in such a manner that the internal air pressure within the tire, rather than a rigid annular spacer, serves to maintain the bead rings in spaced-apart relationship from one another, thereby effectively holding the tire onto the rim of the wheel. In this embodiment as shown in FIGURE 3, the tire is mounted on a split rim comprising two rim halves 71, 72 held together by suitable means such as bolts (not shown). Each rim half has a radially outwardly depending flange 74, 75.

In construction, this tire is similar to that shown in FIGURE 1 and consists of an air impervious inner liner 57 and a plurality of carcass plies 52 cooperatively defining a torus totally enclosed except for an air pressurizing valve 62, said valve extending through one of the sidewalls 55 of the tire. The crown of the carcass is covered by a suitable tread 56, and the rim-contacting portion of the tire is protected by chafer strips 61.

Anchored securely between two adjacent carcass plies are two inextensible bead rings 53, 54, the space on either side of the rings being filled with suitable strips 58 of elastomeric material, said strips referred to as fillers. Given the known distance between the two flanges 74 and 75 of the rim, the bead rings are positioned, while the tire is being built, so that they will be displaced toward one another when the tire is mounted upon the rim. In other words, the axial distance between the bead rings is decreased when the tire is mounted on the rim. This relieves the stress on the portion of the carcass plies disposed between the two rings and results in a slight flexing thereof so that upon inflation of the tire the cords in this portion are not subjected to any substantial amount of tension. In this manner, the air pressure exerts an axially outwardly directed force against the bead rings which urges the bead rings and the carcass surrounding the same into tight engagement with the flanges 74 and 75 of the rim. Because the portion of the carcass between the bead rings is relatively unstressed, it does not adversely inhibit the axially outwardly directed force of the air pressure on the bead rings.

In building this tire, a mandrel is formed as hereinbefore described, but without incorporation of the bead rings or spacer therein. An inner liner, with the air valve preferably inserted therethrough, is then wrapped around the mandrel after which one or more carcass plies are toroidally wound therearound. After one or more plies are completed, but before commencing with the winding of additional plies, the inextensible bead rings are placed against the carcass plies, said rings being separated by a slightly greater distance than that which they will assume when the tire is mounted onto the rim. A suitable elastomeric filler strip is laid along either side of each bead to fill in the space created by the path of the cords of the adjacent plies passing on opposite sides of the bead rings. Additional carcass plies are thereafter wrapped around the mandrel and around the beads to securely hold the rings in place. The tire is then completed by the addition of suitable chafer strips, sidewall and tread portions thereto after which the mandrel is removed and the tire is cured. As previously stated, assembling the tire onto the rim of the wheel, and tightening the bolts to urge the flanges toward one another, causes the beads to move together slightly, thereby relaxing the stress on the carcass cords interposed between the beads.

It can be readily seen that various modifications can be made in the construction of the tire and particularly in the rim-locking mechanism thereof without departing from the basic principal of the invention as hereindescribed. For instance, referring again to FIGURE 1, it can be seen that a rim-locking device, comparable to the one shown therein but without bead bundles, can be used so long as the device possesses the requisite properties of high strength and resistance to elongation. For example, a flat rigid annular ring of metal or plastic generally conforming in shape to the bead bundles and spacer can be employed. This ring can be produced by molding or other means, and can be of unitary or laminated construction. It can be skim coated with an elastomeric material or can be otherwise treated or covered so as not to damage or abrade the inner liner of the tire. Furthermore, it can consist of rigid annular bead-shaped members separated by ribs or spokes instead of being of solid construction. Likewise, it can-sist of a singular bead bundle reinforced, for example, by impregnation or coating with a thermosetting resin or the like to render it resistant to axial compression. In like manner, the construction of the rim-locking means shown in FIGURE 3 can be appropriately modified without deviating from the basic concept of utilizing the inflation pressure of the tire to lock the tire securely on the wheel rim.

Figure 4:
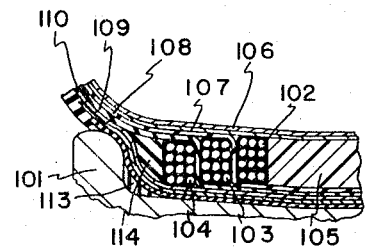
FIGURE 4 is a partial cross section showing another arrangement wherein the bead rings are interspaced between carcass plies.

A further variation, showing a multiple bead arrangement, with each bead ring anchored in place by a carcass ply disposed therearound, is shown in FIGURE 4. The tire therein shown is mounted on a rim 101 and contains three bead rings, 102, 103, 104 disposed on either side of a rigid annular spacer 105. The inner chamber of the tire is provided with a suitable inner liner 106 having a high degree of impermeability to air. The carcass consists of four plies of cords or tapes spirally wound around the inner liner. After the first ply 107 is formed, the rigid spacer 105 is placed in position and the first two bead rings 102 are positioned on either side of the spacer in abutting relationship thereto. Thereafter the second ply 108 is wrapped around the torus and around the beads 102 and spacer 105 to anchor them in position. Beads 103 and 104 are sequentially placed into position and are anchored in like manner by the subsequently wrapped plies 109, 110. Prior to applying the outermost carcass ply 110 to the torus, a filler material 114, typically comprising a deformable but substantially incompressible elastomeric material, is positioned against the outer bead rings 104 thereby permitting a smooth transitional path for this outer carcass layer.

Suitable chafer strips 111, 112 are wrapped around the inner rim contacting surface of the tire. Strips of elastomeric material are molded during the curing of the tire to form the heel portions 113 which conform the tire to the rim.

In constructing the carcass of the tire of this invention, it should be understood that a wide variety of cord and tape materials can be used, and that these materials can be changed from one ply to the next. They may be coated or impregnated with suitable elastomers so that the individual cords are insulated from one another. Furthermore, an almost limitless number of winding tensions and programs can be used.

It is furthermore contemplated that various changes can be made in regard to other aspects of the tire construction. For instance, breaker strips of well-known construction can be used between the carcass and the tread to impart additional stability or strength to the tire. Instead of breaker strips, one or more layers of wire-reinforced rubber can be placed underneath the tread portion of the tire to increase the puncture resistance thereof.

It is also considered to be within the scope of the invention to apply various elastomeric compounds to the exterior surface of the tire by suitable means such as injection molding. Polyurethane is particularly well adapted for use in this type of operation. Using existing techniques, however, other materials such as ethylene propylene terpolymer, SBR, polybutadiene and other rubber or rubber-like compounds can be used to form the tread, sidewall, and heel portions of the tire. Instead of providing the tire with one air passage, a number of passages can be provided so as to facilitate the removal of the mandrel from within the carcass. In such a case it would probably be advantageous to permanently seal all but one of these air passages after removal.

There are other obvious modifications and variations which can be made without departing from the scope of the invention which is limited and defined only by the following claims.

What is claimed is:

1. In combination with a wheel having a rim provided with a removable flange, a filament wound tire devoid of bead means and having a totally enclosed air chamber and means for introducing air into and retaining it within said chamber, the improvement comprising a substantially axially incompressible and radially inextensible flat rigid spacer in substantial axial alignment with the rim flanges and adapted to exert a pressure against said flanges when the removable flange is assembled on to the wheel to maintain the tire on the rim of the wheel.

2. The combination as specified in claim 1 including at least one inextensible bead ring on either side of said spacer in contact with a portion of the tire.

(References on following page)

References Cited by the Examiner
UNITED STATES PATENTS

| | | | |
|---|---|---|---|
| 903,714 | 11/1908 | Hawley et al. | 152—363 X |
| 1,210,434 | 1/1917 | Denman | 156—117 |
| 1,316,104 | 9/1919 | Nall | 156—117 |
| 1,522,805 | 1/1925 | Chappell | 152—363 X |
| 1,637,599 | 8/1927 | Ballew | 152—401 |
| 2,424,918 | 7/1947 | Brown | 152—401 |
| 2,857,951 | 10/1958 | Roudenbush | 152—363 |
| 2,953,184 | 9/1960 | Erstad | 152—363 |

References Cited by the Applicant
UNITED STATES PATENTS

| | | |
|---|---|---|
| 2,915,102 | 12/1959 | Alexeff et al. |
| 3,044,609 | 7/1962 | Branick. |
| 3,171,462 | 3/1965 | Reinhart. |
| 3,183,134 | 5/1965 | Frisby. |

ARTHUR L. LA POINT, *Primary Examiner.*

C. W. HAEFELE, *Assistant Examiner.*